United States Patent [19]

Pokrandt et al.

[11] Patent Number: 4,925,431
[45] Date of Patent: May 15, 1990

[54] FLEXIBLE SHAFT COUPLING WITH POLYMERIC RESIN HUBS

[75] Inventors: Glenn C. Pokrandt, Menomonee Falls; William F. Busser, Pewaukee; Donald N. Timmermann, Wauwatosa; Thomas N. Kuliga, West Allis, all of Wis.

[73] Assignee: The Falk Corporation, Milwaukee, Wis.

[21] Appl. No.: 302,750

[22] Filed: Jan. 31, 1989

Related U.S. Application Data

[63] Continuation-in-part of Ser. No. 166,431, Mar. 10, 1988, abandoned.

[51] Int. Cl.⁵ .............................. F16D 3/52
[52] U.S. Cl. ........................... 464/54; 464/87; 464/903
[58] Field of Search ............... 74/DIG. 10; 403/359; 464/49, 51, 54, 83, 85, 87, 92, 158, 180, 181, 903

[56] References Cited

U.S. PATENT DOCUMENTS

| | | | |
|---|---|---|---|
| 1,297,507 | 3/1919 | Sykes | 464/83 X |
| 1,587,403 | 6/1926 | Nicholson | 464/903 X |
| 1,763,842 | 6/1930 | Bibby | 464/54 |
| 1,939,207 | 12/1933 | Duckworth | 464/85 |
| 2,394,448 | 2/1946 | Herold et al. | 464/83 X |
| 2,555,909 | 6/1951 | Wellauer | 464/54 |
| 2,619,211 | 11/1952 | Belden | 192/67 |
| 2,699,656 | 1/1955 | Anderson et al. | 464/903 X |
| 2,885,871 | 5/1959 | Wallauer | 464/54 |
| 2,904,976 | 9/1959 | Bay et al. | |
| 2,924,082 | 2/1960 | Reich | 464/92 X |
| 2,924,954 | 2/1960 | Panhard | |
| 2,958,213 | 11/1960 | Donner | 464/83 |
| 3,019,622 | 2/1962 | Fermier | 464/86 |
| 3,096,632 | 7/1963 | Wellauer et al. | 464/54 |
| 3,196,635 | 7/1965 | Schmitter | 464/54 |
| 3,304,743 | 2/1967 | Paulsen | 464/72 |
| 3,367,142 | 2/1968 | Groves et al. | 464/181 X |
| 3,434,303 | 3/1969 | Leyer | 464/83 X |
| 3,677,033 | 7/1972 | Kneeland | 464/85 |
| 4,044,572 | 8/1977 | Wallauer et al. | |
| 4,114,403 | 9/1978 | Grey | 464/87 |
| 4,214,458 | 7/1980 | Philleo | 464/85 |
| 4,413,980 | 11/1983 | Walloch | 464/82 |
| 4,487,591 | 12/1984 | Berg | 464/87 X |
| 4,627,885 | 12/1986 | Arit | 156/160 |

FOREIGN PATENT DOCUMENTS

| | | | |
|---|---|---|---|
| 744869 | 3/1970 | Belgium | 464/158 |
| 644992 | 1/1979 | U.S.S.R. | 74/DIG. 10 |
| 724829 | 3/1980 | U.S.S.R. | 464/85 |
| 1117311 | 6/1968 | United Kingdom . | |
| 1580540 | 12/1980 | United Kingdom . | |

*Primary Examiner*—Daniel P. Stodola
*Attorney, Agent, or Firm*—Quarles & Brady

[57] ABSTRACT

A flexible shaft coupling of a type which uses a serpentine metal grid to connect teeth on hubs attached to driving and driven shafts has the sides of the teeth made of a polymeric resin material such as a polyurethane or a reinforced nylon 6/6, lubricated with PTFE. The side faces of the teeth deflect and deform under torque load to accommodate to the grid.

25 Claims, 2 Drawing Sheets

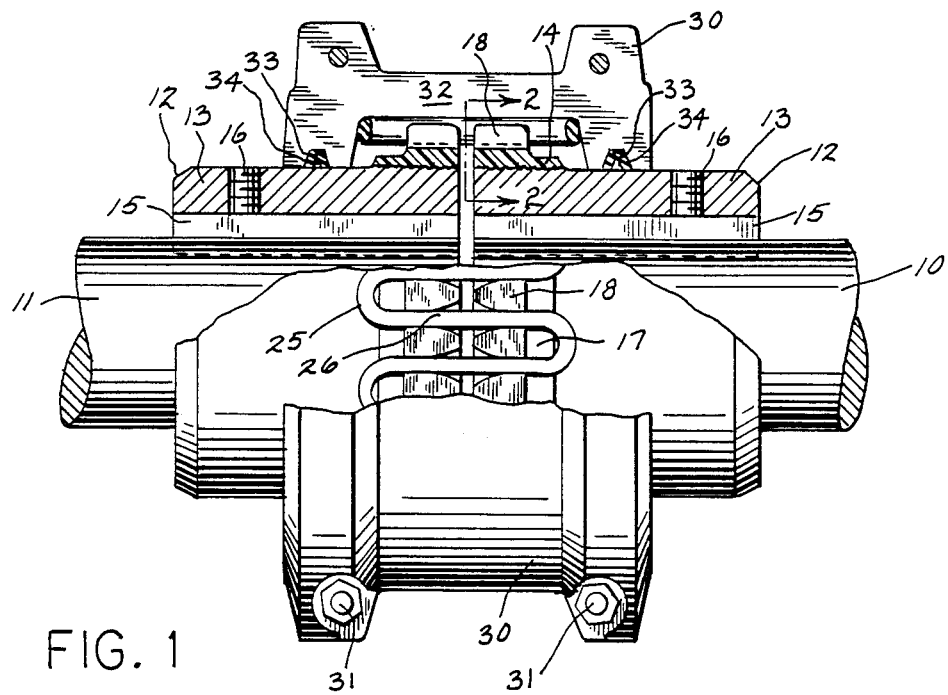
FIG. 1
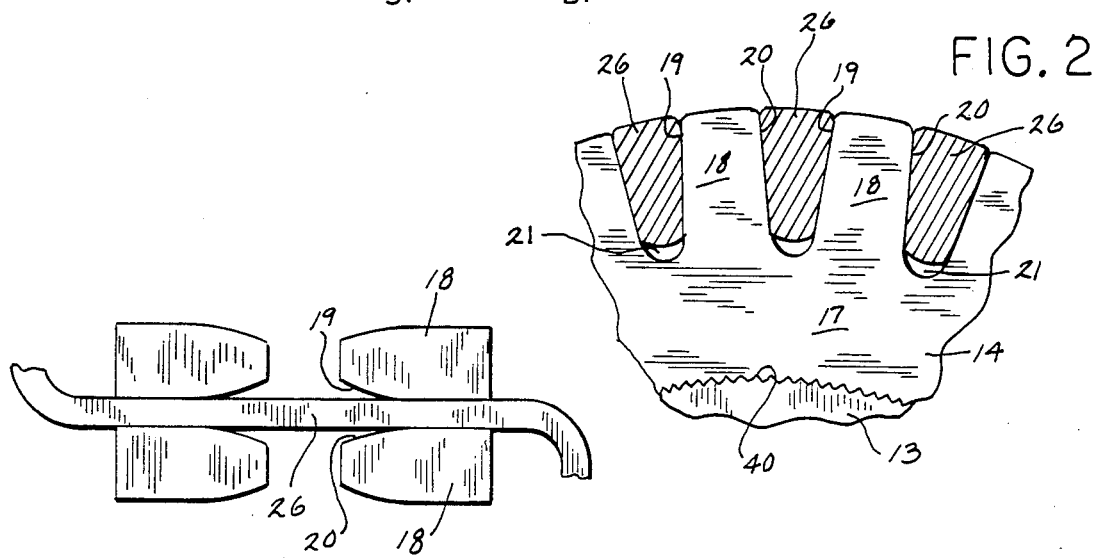
FIG. 2
FIG. 3
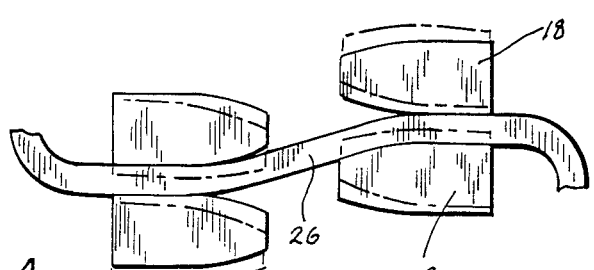
FIG. 4

FLEXIBLE SHAFT COUPLING WITH POLYMERIC RESIN HUBS

This application is a continuation-in-part of application Ser. No. 166,431 filed Mar. 10, 1988.

BACKGROUND OF THE INVENTION

This invention relates to shaft couplings, and more particularly to improvements in couplings of the type that use a grid of metal rungs to join coupling halves.

A common form of flexible coupling used for joining driving and driven shafts utilizes a metal grid to join coupling halves mounted on the shafts being coupled. The grid is often formed as a serpentine with straight grid rungs joined together at alternate ends by integral end loops. The rungs are received in axially aligned, radially extending slots formed between metal teeth on each of the coupling hubs. The rungs span the space between the coupling halves and act to transmit torque between the hubs. The side walls of the teeth are generally curved in an axial direction so that the unsupported length of each rung is reduced as the torsional load transmitted between the coupling halves increases. An early example of this type of flexible coupling is found in U.S. Pat. No. 1,763,842 issued June 17, 1930 to Bibby.

In the prior flexible couplings of this type, the rungs and the hubs are made of metal, usually steel, and the rungs are heat treated.

This form of flexible coupling provides an effective device for joining shafts, but because of its construction it may be too stiff in its response to torsional load. There are applications for shaft couplings in which significantly less stiffness would be desirable.

Attempts to reduce the stiffness inherent in this type coupling have in the past focused on altering the form of the grid or of the tooth curvature to make them more flexible. Prior efforts have included using straight metal rungs joined at their ends by elastomer members (U.S. Pat. No. 4,413,980 issued Nov. 8, 1983 to Walloch), using complementary closed loops (U.S. Pat. No. 3,196,635 issued Jul. 27, 1965 to Schmitter), and using alternate U-shaped spring grid elements (U.S. Pat. No. 2,555,909 issued June 5, 1951 to Wellauer).

It is noteworthy that thus far no efforts have been put forth toward altering the composition of the teeth of the hubs for the purpose of increasing the flexibility. In particular, no attention has apparently been directed to altering the material of the hubs to reduce the stiffness of the teeth.

In the prior flexible couplings using metal grids working against metal hubs, it is typical that all grid rungs and all teeth will not carry the same load because of variations in the circumferential tooth spacing that are inherent in the manufacturing process. As a result, one or more rungs may be out of contact with a tooth and, therefore, will not carry any load. Thus far, the inherent flexibility of the grid has been relied upon to eventually, at high load, evenly distribute the load between all rungs and all teeth.

SUMMARY OF THE INVENTION

In accordance with the invention we provide an improved flexible coupling of the type having a pair of hubs each including a plurality of radially extending teeth whose adjacent side faces define slots therebetween, and a grid joining the hubs and which includes a plurality of metal rungs received in the slots and spanning the space between the hubs, and wherein the side faces of the teeth in contact with the rungs are formed of a polymeric resin material which deforms relative to the rungs as the coupling is subjected to torque loads.

The invention also resides in a new use for known polymeric resin materials, and may be expressed as a method of joining a driven shaft to a driving shaft which includes providing a pair of hubs each having a metal body and a plurality of radially extending teeth spaced around the body with the teeth having side faces of polymeric resin material that define slots between the teeth, mounting one of the hubs on each of the shafts, and joining the hubs by a grid that has a plurality of metal rungs received in the slots of both hubs.

Each tooth may be formed in its entirety of the polymeric resin material, or only the side faces of each tooth may be formed of such material and the remainder of the tooth may be metal. In either case, the polymeric resin material will deform under load and result in a more even distribution of the load through all rungs and teeth by insuring that all rungs will be in contact with their respective teeth when under load.

In one preferred form of the invention, the entire polymeric resin teeth are molded in place about a metal hub base. The surface of the metal base to which the teeth are attached is knurled or otherwise roughened. The polymeric resin teeth may also be glued to the metal base or to an intermediate layer. In another preferred form, the polymeric resin is provided as a coating to the sides of the teeth that are in contact with the rungs.

One preferred polymeric resin material is a polyurethane. The polyurethane can be a liquid cast polyether base urethane thermoset material that is cross linked and which exhibits high tensile strength and hardness, with good elongation, abrasion resistance and flexural modulus properties. However, a more preferred polyurethane is an injection molded polycaprolactone urethane thermoplastic material.

Another preferred material is a nylon such as a glass or carbon filled nylon 6/6 with PTFE (polytetrafluoroethylene). Such nylon material exhibits even greater tensile strength and hardness at low elongation and with good abrasion resistance and excellent flexural modulus properties.

As compared with metal teeth, the polymeric resin coupling teeth provide significantly greater tooth flexibility for greater coupling resiliency.

Coupling teeth of polymeric resin material will more readily adjust to variations in the rungs so as to improve the load distribution between the teeth and rungs. The improved load distribution provides increased fatigue life with reduced contact stress between the rungs and the teeth. The polymeric resin teeth will reduce the wear on the grid rungs during operation both because of the lower coefficient of friction that the polymeric resin material provides and the improved surface finish that can result from forming the teeth directly in a molding or coating operation without machining. The need for lubrication may be entirely eliminated as a result.

It is a principal object of the invention to provide a flexible coupling of the type using metal rungs that is significantly less stiff than such flexible couplings have been in the past.

It is another object of the invention to provide a flexible shaft coupling using metal rungs joining slots between teeth of hubs mounted on driving and driven shafts and in which the teeth will deform to accommodate the rungs as the coupling is subjected to torque loads.

It is a further object of the invention to provide a flexible coupling that has improved load distribution between metal rungs and hub teeth joined by the metal rungs, and which results in increased fatigue life.

It is also an object of the invention to provide a flexible shaft coupling using metal rungs joining hubs on driving and driven shafts that does not require lubrication between the rungs and hub teeth.

The foregoing and other objects and advantages of the invention will appear in the following detailed description. In the description reference is made to the accompanying drawings which illustrate preferred embodiments of the invention.

BRIEF DESCRIPTION OF THE DRAWINGS

FIG. 1 is a view in elevation and partly in section of a coupling according to the present invention;

FIG. 2 is a partial view in section of the coupling teeth and interlinking grid of the coupling and taken in the plane of the line 2—2 of FIG. 1;

FIG. 3 is a fragmentary view in elevation of coupling teeth and interlinking grid of the coupling and shown in an unloaded, relaxed condition;

FIG. 4 is a view similar to FIG. 3 but showing the grid and teeth in a torque loaded condition;

DETAILED DESCRIPTION OF THE PREFERRED EMBODIMENTS

Figure 5:
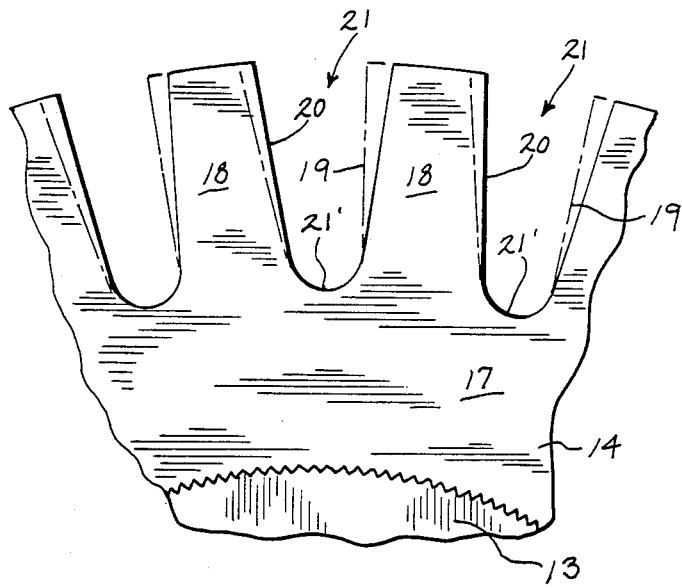
FIG. 5 is an enlarged end view of a portion of a hub of the invention showing the deflection of the hub teeth under load.

A flexible coupling incorporating the improvement of the present invention acts as a connection between a driving shaft 10 and a driven shaft 11. The coupling includes a pair of similar hubs 12 which are bored to receive the shafts 10 and 11. Each hub 12 includes a cylindrical steel base portion 13 about which a tooth structure 14 is cast. The base portions 13 are provided with slots to receive keys 15 that are also received in cooperating slots provided in the shafts 10 and 11 to thereby transmit torque between the hubs 12 and the shafts. Set screws 16 fix the hubs 12 relative to the keys 15 and thereby prevent axial movement of the hubs on their respective shafts.

The tooth structures 14 each include a ring portion 17 that encircles the metal base portion 13 and a plurality of radially projecting, axially directed teeth 18 extending from the ring portion 17. As shown in FIG. 2, each tooth 18 has side faces 19 and 20 that converge slightly in a radially outward direction. The result is that tapered slots 21 are defined between the side faces 19 and 20 of adjacent teeth 18.

A flexible serpentine grid 25 joins the two hubs 12. The grid 25 has straight rung portions 26 that are received in the slots 21 between the teeth 18 of aligned hubs 12. As shown in FIG. 3, the sides 19 and 20 of the teeth 18 are curved with their axes of revolution in a plane perpendicular to the axis of the shafts 10 and 11. The curvature is exaggerated in the drawings.

Suitable coupling cover members 30, which may be identical, are provided to act as a shield to prevent the entry of dust and grit and to hold the grid 25 in place. The cover members 30 are joined to each other by bolts 31 at abutting faces 32 of the members. The cover members 30 together provide continuous annular cavities 33 that receive resilient sealing rings 34 disposed against the periphery of the base portion 13 of the hub 12.

The tooth structures 14 are formed from a polymeric resin material. The tooth structure 14 is preferably injection molded about the base portion 13 which is provided with a knurled outer surface 40, or is otherwise roughened, to accept the molded tooth structure 13. The tooth structure 14 may also be attached to the base portion 13 by an adhesive or by joining to an intermediate layer of bonding material. The slots 21 between the teeth 18 are preferably formed during the molding process, but they may be developed by machining a continuous flange of polymeric resin material.

One preferred polymeric resin material is a polyether based urethane thermoset material which is cross-linked. A particularly useful material is that identified as compound 1603-75 available from Albert Trostel Packings, Ltd., Lake Geneva, Wis. Such compound incorporates toluene diisocyanate and is cured using 4,4¹-methylenebis (2-chloroaniline). The urethane has excellent tensile strength and hardness as well as good elongation, abrasion resistance and flexural modulus properties. The physical properties of the material are as follows:

| Tensile Strength | |
| --- | --- |
| D-412 | 7900 psi |
| 100% Modulus | |
| D-412 | 5900 psi |
| Elongation | |
| D-412 | 170% |
| Tear Strength | |
| D-624 Die "C" | 1050 pli |
| D-1938 Split | 250 pli |
| D-470 Split | 120 pli |
| Compression Set | |
| D-395 B 22 Hrs @ 158° F. | 70% |
| D-395 A 22 Hrs @ 158° F. | 2% |
| Compression Modulus | |
| 10% | 4300 psi |
| 25% | 8000 psi |
| Resilience | |
| Bashore D-2632 | 52% |
| Solenoid Brittle Point | |
| D-746 | −90° F. |
| Heat Distortion Temp | |
| D-648 @ 264 psi | 134° F. |
| Impact Strength | |
| D-256 Notched Izod | 13 Ft-lb/in |
| Flexural Modulus | |
| D-790 | 140,000 psi |
| Specific Gravity | 1.18 |
| Hardness | |
| D-2240 Shore D | 76 |

Another preferred polyurethane which can be injection molded is a polycaprolactone urethane thermoplastic material that is cross-linked. A particularly useful material is that identified as compound PC96-300 available from K.J. Quinn, Malden, Mass. The physical properties of such material are as follows:

| Tensile Strength | |
| --- | --- |

|  |  |
|---|---|
| D-412 100% Modulus | 7500 psi |
| D-412 Elongation | 2500 psi |
| D-412 Tear Strength | 225% |
| D-624 Die "C" | 900 pli |
| Specific Gravity | 1.21 |
| Hardness D-2240 Shore D | 65-70D |

Other preferred polymeric resins are glass or carbon fiber reinforced, PTFE lubricated nylon 6/6 resins, such as the "RFL" or "RCL" series available from LNP Engineering Plastics of Malvern, Pa. Such reinforced nylons have a greater tensile strength, flexural modulus and hardness then the urethane with the result that they have less resiliency then does the urethane. However, the resiliency is still much greater than a comparable metal hub and the nylons exhibit the same good abrasion resistance and low coefficient of friction as the urethane. The physical and composition properties of the nylon 6/6 materials are as follows:

|  | RFL-4028 | RFL-8028 | RCL-4036 |
|---|---|---|---|
| Reinforcement | 40% glass fiber | 40% long glass fiber | 30% carbon fiber |
| PTFE | 10% | 10% | 15% |
| Tensile Strength D-638 | 29,000 psi | 30,000 psi | 30,500 psi |
| Tensile Elongation D-638 | 3-4% | 4% | 3-4% |
| Flexural Strength D-790 | 42,000 psi | 50,500 psi | 43,500 psi |
| Flexural Modulus D-790 | 1,650,000 psi | 1,750,000 psi | 2,300,000 psi |
| Heat Distortion Temp. D-256 @ 264 psi | 495° F. | 500° F. | 490° F. |
| Impact Strength D-256 Notched IZOD, | 2.4 ft-lb/in | 3.8 | 1.4 |
| Unnotched IZOD | 14-16 ft-lb/in | 18 | 10 |
| Specific Gravity D-792 | 1.56 | 1.56 | 1.38 |
| Hardness Rockwell | R121 | R121 | R121 |

In the typical flexible coupling with a serpentine grid, an increase in the torque load on the coupling will cause the hub members 12 on the two shafts to assume an increased angular displacement relative to each other. This will cause the straight rungs of the grid to advance their contact along the curved sides of the teeth toward the space between the hubs. This results in the known decrease in the unsupported span of the rungs which then function essentially as short beams. Thus, as the load increases, the unsupported length of the rungs decreases and the grid member becomes stiffer and increasingly restrains angular displacement of the coupling hubs. A similar action will occur in the coupling of the present invention. In addition to the advancement of the contact point of the rungs toward the gap between the hubs, the teeth 18 will also deflect and deform to a significant extent. That is, rather than being the anchors for the flexible grid as in the prior couplings with metallic teeth, the teeth will deflect to a significant degree and thereby provide a greater degree of the flexibility in the coupling.

The effect of torque on the rungs and teeth is illustrated in FIGS. 3, 4 and 5. As shown in FIG. 4, the rung 26 will be displaced from the normal position illustrated in FIG. 3, and the teeth 18 will be deformed and displaced. As shown in FIG. 5, the teeth will function as short cantilevered beams and will be physically displaced from their normal position illustrated in solid lines in FIG. 5 to the positions illustrated by dotted lines. The teeth 18 will also be twisted about their axes so that the narrower portions of the teeth 18 adjacent the gap between the hubs will be displaced to a greater extent than the thicker portion of the teeth remote from the gap. The deformation and displacement of the teeth will accommodate a significant portion of the torque load. The degree of deflection and deformation illustrated in FIGS. 4 and 5 is greatly exaggerated for purposes of illustration. The effect of the increased deformation and deflection is illustrated in the curves of FIG. 6.

Figure 6:
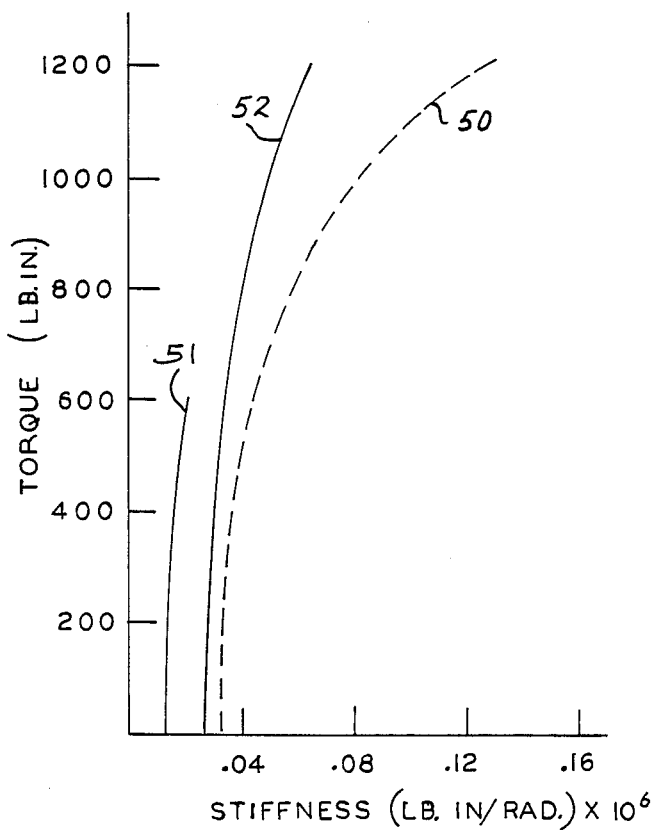
FIG. 6 is a graph comparing the stiffness of the coupling of FIGS. 1-5 under torque with that of a prior flexible coupling of the same size but employing metal teeth on the hubs.

FIG. 6 represents a graph of the stiffness of the coupling in relation to the torque applied to the coupling. The torque is measured in terms of pound-inches while the stiffness is measured in terms of pound-inches per radian. FIG. 6 contains the results of tests run on a standard coupling with a metal serpentine grid and a metal hub with metal teeth, and on similar couplings which were identical to the standard coupling except that they included a urethane tooth structure and a nylon 6/6 tooth structure as described in connection with FIGS. 1-5. Curve 50 represents the results of the tests on the standard, prior art flexible coupling with metal teeth, curve 51 represents the results of the tests on a coupling with teeth of the urethane thermoplastic material described above, and curve 52 represents the results of the tests on two couplings with teeth of the RFL-8028 and RCL-4036 nylon 6/6 described above. The urethane thermoset material would have test results similar to that for the nylon 6/6 materials represented by curve 52. It will be seen that there is a significant decrease in stiffness resulting from the present invention and that the reduction in stiffness becomes more pronounced as the torque load increases. The nylon teeth do not exhibit as great a reduction in stiffness as does the thermoplastic urethane teeth. However, the nylon teeth and the thermoset urethane teeth are capable of sustaining the same full rated torque load of the coupling with steel toothed hubs, and at full load the stiffness is about half of that of the steel hubs.

The increased deformation and deflection provided by the polymeric resin teeth will also greatly enhance the load distribution between the teeth and the grid. Not only will the teeth conform to irregularities in a particular rung of the grid, they will also accommodate irregularities between the circumferential spacings of rungs or teeth and in the parallelism between rungs, all of which result from the manufacturing processes. As a result of the deflection of the teeth, contact between grid and teeth is much more evenly distributed under loads and particularly at lower torque loads. This contributes to increased fatigue life. The fatigue life is further enhanced by the ability to readily cast or mold radiused bottoms 21' for the slots 20 so that stress concentration at the root of the teeth is reduced as a factor in fatigue life.

The advantage of enhanced load distribution can also be obtained by providing teeth in which only the side faces of the teeth are formed of polymeric resin material and the remainder of each tooth is metal. Such an approach is illustrated in FIG. 7.

Figure 7:
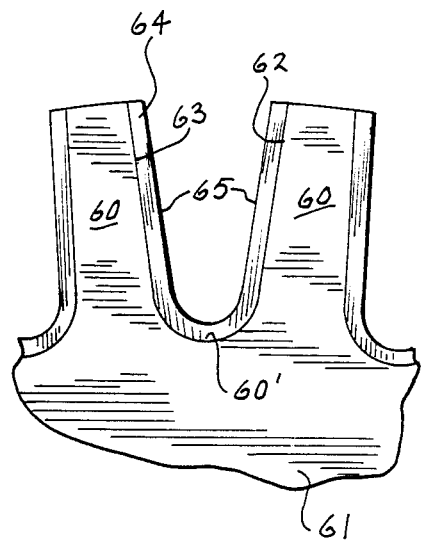
FIG. 7 is a partial view in elevation of the teeth of the hub of a second embodiment of the invention.

In FIG. 7, the metal teeth 60 are integral with the metal hub 61. The adjacent sides 62 and 63 of the teeth are coated with a layer 64 of polymeric resin which may also cover the radiused bottoms 60'. The result is side faces 65 for the teeth 60 that will distort under load and accommodate the irregularities in rung and tooth spacing and in rung parallelism. This will insure that all rungs will be in full contact with their adjacent teeth. For best load distribution, the layer 64 should have a thickness at least equal to the circumferential error anticipated in the spacing or parallelism.

The polymeric resin in the layer 64 may be the same as that used in the embodiment of FIGS. 1-5. In any event, it should have similar properties.

Polymeric resins such as urethane and nylons have very good wear resistance. The forming of the teeth side faces by casting, molding or coatings can produce a very fine surface finish. As a result, it is possible to eliminate the need for lubrication between the grid and the teeth of the coupling.

We claim:

1. In a flexible coupling having a pair of hubs each including a plurality of radially extending teeth whose adjacent side faces define slots therebetween, and a grid joining the hubs and which includes a plurality of metal rungs received in the slots and spanning the space between the hubs, the improvement wherein:

the side faces of the teeth in contact with the rungs are formed of a polymeric resin material which deforms relative to the rungs as the coupling is subjected to torque loads whereby the deformation of the teeth is sufficient to compensate for anticipated manufacturing error in the circumferential spacing between the teeth or the rungs.

2. In a flexible coupling having a pair of hubs each including a plurality of radially extending teeth whose adjacent side faces define slots therebetween, and a grid joining the hubs and which includes a plurality of metal rungs received in the slots and spanning the space between the hubs, the improvement wherein:

the teeth are formed of a polymeric resin material which deforms relative to the rungs as the coupling is subjected to torque loads whereby the deformation of the teeth is sufficient to compensate for anticipated manufacturing error in the circumferential spacing between the teeth or the rungs.

3. A coupling in accordance with claim 2 wherein the teeth are part of a tooth structure that is formed about a central metal body for each hub.

4. A coupling in accordance with claim 3 wherein the metal body has a roughened surface in contact with the tooth structure, and the tooth structure is molded about the metal body.

5. A coupling in accordance with claim 2 wherein the polymeric resin is a polycaprolactone based urethane thermoplastic material having relatively high tensile strength and hardness.

6. A coupling in accordance with claim 5 wherein the tensile strength is about 7500 psi.

7. A coupling in accordance with claim 5 wherein the hardness is 65 to 70 Shore D.

8. A coupling in accordance with claim 2 wherein the polymeric resin is a reinforced nylon 6/6.

9. A coupling in accordance with claim 8 wherein the nylon 6/6 is lubricated by PTFE.

10. A coupling in accordance with claim 8 wherein the tensile strength is about 30,000 psi.

11. A coupling in accordance with claim 8 wherein the hardness is about Rockwell R120.

12. In a flexible coupling having a pair of hubs each including a plurality of radially extending teeth whose adjacent side faces define slots therebetween, and a metal grid joining the hubs and which includes a plurality of metal rungs received in the slots and spanning the space between the hubs, and integral end loops connecting adjacent rungs, the improvement wherein:

the hubs each include a metal base adapted for attachment to a shaft and the teeth are formed about the metal base and are made of a polymeric resin material which deforms relative to the rungs as the coupling is subjected to torque loads whereby the deformation of the teeth is sufficient to compensate for anticipated manufacturing error in the circumferential spacing between the teeth or the rungs.

13. A coupling in accordance with claim 12 wherein the polymeric resin is selected from a group consisting of: polyurethane and nylon.

14. In a flexible coupling having a pair of hubs each including a plurality of radially extending teeth whose adjacent side faces define slots therebetween, and a metal grid joining the hubs and which includes a plurality of metal rungs received in the slots and spanning the space between the hubs, and integral end loops connecting adjacent rungs, the improvement wherein:

the teeth are formed with a metal core and with side faces of a polymeric resin material joined to the metal core, said polymeric resin side faces adapted to deform relative to the rungs as the coupling is subjected to torque loads whereby the deformation of the teeth side faces is sufficient to compensate for anticipated manufacturing error in the circumferential spacing between the teeth or the rungs.

15. A coupling in accordance with claim 14 wherein each side face has a circumferential thickness in excess of the largest anticipated manufacturing error in the circumferential spacing between the teeth or the rungs.

16. A coupling in accordance with claim 14 wherein the polymeric resin is a polyurethane material having relatively high tensile strength and hardness.

17. A coupling in accordance with claim 16 wherein the tensile strength is about 7500 to 7900 psi.

18. A coupling in accordance with claim 16 wherein the hardness is 65 to 76 Shore D.

19. A coupling in accordance with claim 18 wherein the tensile strength is about 30,000 psi.

20. A coupling in accordance with claim 14 wherein the polymeric resin is a reinforced nylon 6/6.

21. A coupling in accordance with claim 20 wherein the nylon 6/6 is lubricated by PTFE.

22. A coupling in accordance with claim 14 wherein the hardness is about Rockwell R120.

23. A method of joining a driven shaft to a driving shaft and transmitting torque therebetween, comprising:

providing a pair of hubs each having a metal body and a plurality of radially extending teeth spaced around the body, the teeth having side faces that define axial slots between the side faces of the teeth, the teeth being formed of a polymeric resin material;

mounting one of the hubs on each of the shafts;

joining the hubs by a grid that has a plurality of metal rungs received in the slots of both hubs; and transmitting torque between the shafts via the grid including deforming the teeth in the torque transmitting mode to a degree sufficient to accommodate anticipated manufacturing error in the circumferential spacing between the teeth or the rungs.

24. A method of joining a driven shaft to a driving shaft and transmitting torque therebetween, comprising:

providing a pair of hubs each having a metal body and a plurality of radially extending teeth spaced around the body, the teeth having side faces that define axial slots between the teeth, the side faces of the teeth being formed of a polymeric resin material being selected from the group consisting of: a polyether based thermoset urethane, a polycaprolactone thermoplastic urethane, and a reinforced PTFE lubricated nylon 6/6;

mounting one of the hubs on each of the shafts;

joining the hubs by a grid that has a plurality of metal rungs received in the slots of both hubs; and transmitting torque between the shafts via the grid including deforming the teeth side faces in the torque transmitting mode to a degree sufficient to accommodate anticipated manufacturing error in the circumferential spacing between the teeth or the rungs.

25. A method of joining a driven shaft to a driving shaft and transmitting torque therebetween, comprising:

providing a pair of hubs each having a metal body and a plurality of radially extending metal teeth spaced circumferentially around the body, the teeth having sides that define axial slots between the teeth designed to receive the rungs of a grid that has a plurality of metal rungs connected at their adjacent ends by integral end loops;

coating the sides of the teeth with a polymeric resin material of a thickness in excess of the largest anticipated manufacturing error in the circumferential spacing between the teeth or the grid rungs;

mounting one of the hubs on each of the shafts;

joining the hubs by the grid with the grid rungs received in the slots of both hubs; and transmitting torque between the shafts via the grid including deforming the teeth coating in the torque transmitting mode to a degree sufficient to accommodate anticipated manufacturing error in the circumferential spacing between the teeth or the rungs.

* * * * *